March 26, 1935. J. WALKER 1,995,695
TRAILER BOLSTER
Filed Feb. 2, 1934
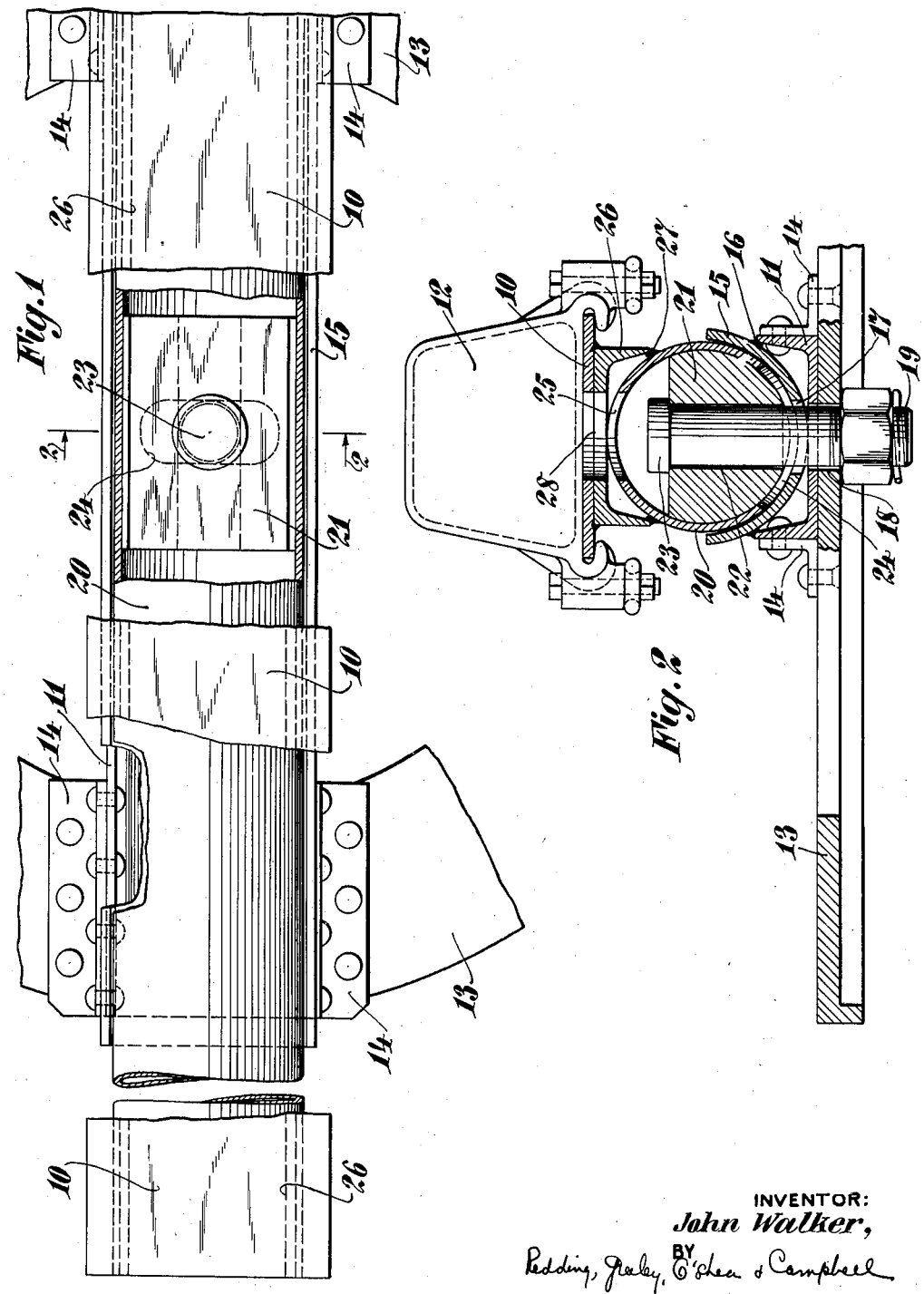
INVENTOR:
John Walker,
BY Redding, Greeley, O'Shea & Campbell
HIS ATTORNEYS Patented Mar. 26, 1935

1,995,695

UNITED STATES PATENT OFFICE 1,995,695

TRAILER BOLSTER

John Walker, Westfield, N. J., assignor to International Motor Company, New York, N. Y., a corporation of Delaware Application February 2, 1934, Serial No. 709,438

3 Claims. (Cl. 280—143)

The present invention relates to bolster constructions for vehicles and embodies, more specifically, an improved bolster construction which is so mounted as to accommodate rocking, as well as swivelling motion about a vertical axis. By means of the present invention, the connection between adjacent vehicles through the bolster is of such character as to accommodate a degree of universal motion, the swivel connection accommodating motion about a vertical axis and the rocking connection accommodating motion about a horizontal axis.

In certain types of motor vehicle service, particularly in transporting poles or similar objects which are secured to the tractor at one end and at the other end to a trailer, in order that the vehicle may negotiate corners the trailer must necessarily swivel about a vertical axis. Inasmuch as the poles are tightly secured to the bolsters, relative movement between the tractor and trailer in a vertical plane is resisted by the truss formed by the poles. Enormous strains result from such conditions and it is an object of the present invention to provide a construction by means of which such motion is accommodated.

A further object of the invention is to provide an improved bolster construction which is of such character as to accommodate swivelling motion about a vertical axis, the construction being of such character as to provide further for rocking motion about a horizontal axis coinciding with the axis of the bolster.

Further objects, not specifically enumerated above, will be apparent as the invention is described in greater detail in connection with the accompanying drawing, wherein:

Figure 1 is a plan view partly broken away and in section showing a bolster constructed in accordance with the present invention.

Figure 2 is a view in section, taken on line 2—2 of Figure 1, and looking in the direction of the arrows.

Referring to the above drawing, the bolster is shown as being formed of an upper bolster beam 10 and a lower beam 11. On the upper beam, chocks 12 are placed these chocks being formed and slidable in the well known fashion to facilitate securing the load on the upper beam.

The lower beam 11 is secured to a turn table plate 13 which is rotatably mounted upon a cooperating fifth wheel member (not shown) upon the tractor or trailer body. Angle irons 14 may be provided to facilitate the securing of the beam 11 to this fifth wheel plate 13 and, as clearly shown in Figure 2, the lower beam 11 is of U cross section. Received within the U section of the lower beam 11 is a semi-cylindrical bearing trough 15 which may be welded to the upwardly extending sides of the beam 11 at 16. The trough is provided with an aperture 17, intermediate the ends thereof and at the bottom of the trough, this aperture aligning with an aperture 18 which is formed in the beam 11 and the turn table plate 13. A king pin 19 is received through the apertures 17 and 18 and serves to secure a cylindrical bearing member 20 to the bearing trough on the lower beam 11 with provision for rocking motion about the axis of the cylindrical member. An elongated block 21 may be placed within the member 20 and is provided with an aperture 22 through which the king pin 19 extends, the head 23 of the pin serving to secure the elements together and prevent separation thereof. An elongated slot 24 is formed in the cylindrical member 20 to accommodate rocking motion between the member 20 and the members 15 and 21 and an aperture 25 is formed in the upper portion of the cylindrical member 20 to permit the king pin 19 to be removed.

The upper bolster beam 10 may have secured to the lower side thereof an inverted U channel member 26 which is welded at 27 to the cylindrical member 20, the upper beam 10 and the channel member 26 being apertured at 28 in alignment with the king pin 19 in order that the said pin may be drawn upwardly through the elements 20, 26 and 10.

Inasmuch as the upper turn table plate 13 is adapted to be mounted upon a cooperating bearing plate so that the said plate and elements carried thereby may turn about the axis of the king pin 19, the bolster construction accommodates swivelling motion about the axis of the king pin 19, as well as rocking motion about the axis of the cylindrical member 20. In this fashion, the upper bolster beam 10 may be rigidly secured to a load and relative movement between the tractor and trailer members is thus accommodated without subjecting the elements to excessive strains.

While the invention has been described with specific reference to the accompanying drawing, it is not to be limited, save as defined in the appended claims.

I claim as my invention:

1. A bolster construction including top and bottom beams, means to mount the beams for movement about a vertical axis, an elongated continuous bearing member extending through the vertical axis on the bottom beam, said bearing member having a cylindrical bearing surface, a bearing member on the top beam and having a continuous cylindrical bearing surface, and means to secure the bearing members together with the bearing surfaces in cooperative engagement.

2. A bolster construction including top and bottom beams, means to mount the beams for movement about a vertical axis, an elongated bearing member on the bottom beam, said bearing member having a cylindrical surface, a hollow cylindrical bearing member on the top beam and adapted to be received in the member on the bottom beam, and a pin passing through the members, the members being formed with apertures through which the pin may pass and the second member having an elongated slot to receive the pin and permit rocking movement between the members.

3. A bolster construction including top and bottom beams, means to mount the beams for movement about a vertical axis, an elongated bearing member on the bottom beam, said bearing member having a cylindrical surface, a hollow cylindrical bearing member on the top beam and adapted to be received in the member on the bottom beam, an insert in the hollow member, and a pin passing through the members and secured in the insert, the members being formed with apertures through which the pin may pass and the second member having an elongated slot to receive the pin and permit rocking movement between the members.

JOHN WALKER.